United States Patent
Pentyala et al.

(10) Patent No.: US 12,456,013 B2
(45) Date of Patent: Oct. 28, 2025

(54) SYSTEMS AND METHODS FOR TRAINING A NEURAL NETWORK MODEL USING KNOWLEDGE FROM PRE-TRAINED LARGE LANGUAGE MODELS

(71) Applicant: Salesforce, Inc., San Francisco, CA (US)

(72) Inventors: Shiva Kumar Pentyala, Mountain View, CA (US); Prafulla Kumar Choubey, San Jose, CA (US); Shashank Harinath, Mountain View, CA (US); Sitaram Asur, Newark, CA (US); Chien-Sheng Jason Wu, Mountain View, CA (US); Zachary Alexander, Berkeley, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 275 days.

(21) Appl. No.: 18/330,216

(22) Filed: Jun. 6, 2023

(65) Prior Publication Data

US 2024/0411991 A1    Dec. 12, 2024

(51) Int. Cl.
*G06F 40/284* (2020.01)
*G06N 3/08* (2023.01)

(52) U.S. Cl.
CPC .............. *G06F 40/284* (2020.01); *G06N 3/08* (2013.01)

(58) Field of Classification Search
None
See application file for complete search history.

(56) References Cited

U.S. PATENT DOCUMENTS

| | | | |
|---|---|---|---|
| 2019/0188326 A1* | 6/2019 | Daianu | G06F 16/90332 |
| 2022/0101052 A1* | 3/2022 | Canim | G06F 17/18 |
| 2023/0154221 A1* | 5/2023 | Gu | G06F 18/253 |
| | | | 382/156 |
| 2024/0070394 A1* | 2/2024 | Peng | G06F 40/40 |
| 2024/0143927 A1* | 5/2024 | Yoon | G06N 3/08 |
| 2024/0176958 A1* | 5/2024 | Raimondo | G06N 3/0455 |
| 2024/0185001 A1* | 6/2024 | Nagaraju | G06F 40/284 |
| 2024/0256906 A1* | 8/2024 | Yadav | G06N 5/02 |

(Continued)

OTHER PUBLICATIONS

Hudeček, Vojtěch, and Ondřej Dušek. "Are LLMs all you need for task-oriented dialogue?." arXiv preprint arXiv:2304.06556 (2023). (Year: 2023).*

(Continued)

*Primary Examiner* — Douglas Godbold
(74) *Attorney, Agent, or Firm* — Haynes and Boone, LLP

(57) ABSTRACT

Embodiments described herein provide a training framework for generative NLP models that operate on previously learnt knowledge from pretrained large language models. Specifically, to train an NLP model to generate a response to a user utterance (e.g., "resolve login issue"), document embeddings of support IT documents encoded by a pretrained LLM are fed to an NLP decoder together with a training dialogue (e.g., a dialogue between the chat agent on how to "resolve login issue"). The NLP decoder can thus be trained by a causal language modeling loss computed based on the predicted next token and the ground-truth token from the training dialogue.

16 Claims, 9 Drawing Sheets

(56) References Cited

U.S. PATENT DOCUMENTS

2024/0281472 A1* 8/2024 LaRhette .............. G06F 16/248

OTHER PUBLICATIONS

Wen, Haoyang, et al. "Sequence-to-sequence learning for task-oriented dialogue with dialogue state representation." arXiv preprint arXiv:1806.04441 (2018). (Year: 2018).*

Dua, Dheeru, et al. "To adapt or to annotate: Challenges and interventions for domain adaptation in open-domain question answering." arXiv preprint arXiv:2212.10381 (2022). (Year: 2022).*

Izacard, Gautier, et al. "Few-shot learning with retrieval augmented language models." arXiv preprint arXiv:2208.03299 1.2 (2022): 4. (Year: 2022).*

* cited by examiner

US 12,456,013 B2

SYSTEMS AND METHODS FOR TRAINING A NEURAL NETWORK MODEL USING KNOWLEDGE FROM PRE-TRAINED LARGE LANGUAGE MODELS

TECHNICAL FIELD

The embodiments relate generally to machine learning systems for natural language processing (NLP), and more specifically to training a neural network based NLP model using knowledge from pre-trained large language models.

BACKGROUND

Automatic chat agents are widely used in customer service, E-commerce, information retrieval, travel assistance, healthcare, and/or the like. Such chat agent employs a neural network based natural language processing (NLP) generative model to generate agent responses to user utterances. Traditionally, NLP models are often trained on a specific task and/or a specific domain to be able to conduct a conversation with human users on specific topics or to perform specific tasks, e.g., a large corpus of prior dialogues between a user and the chat agent on how to resolve IT issues. As NLP models, such as large language models (LLMs) can often have a complicated architecture and over a billion parameters associated with its vast number of neurons, training or finetuning LLMs for every task or every domain can be extremely inefficient.

Therefore, there is a need for an efficient training framework to train NLP based chat agents on different tasks.

Figure 1:
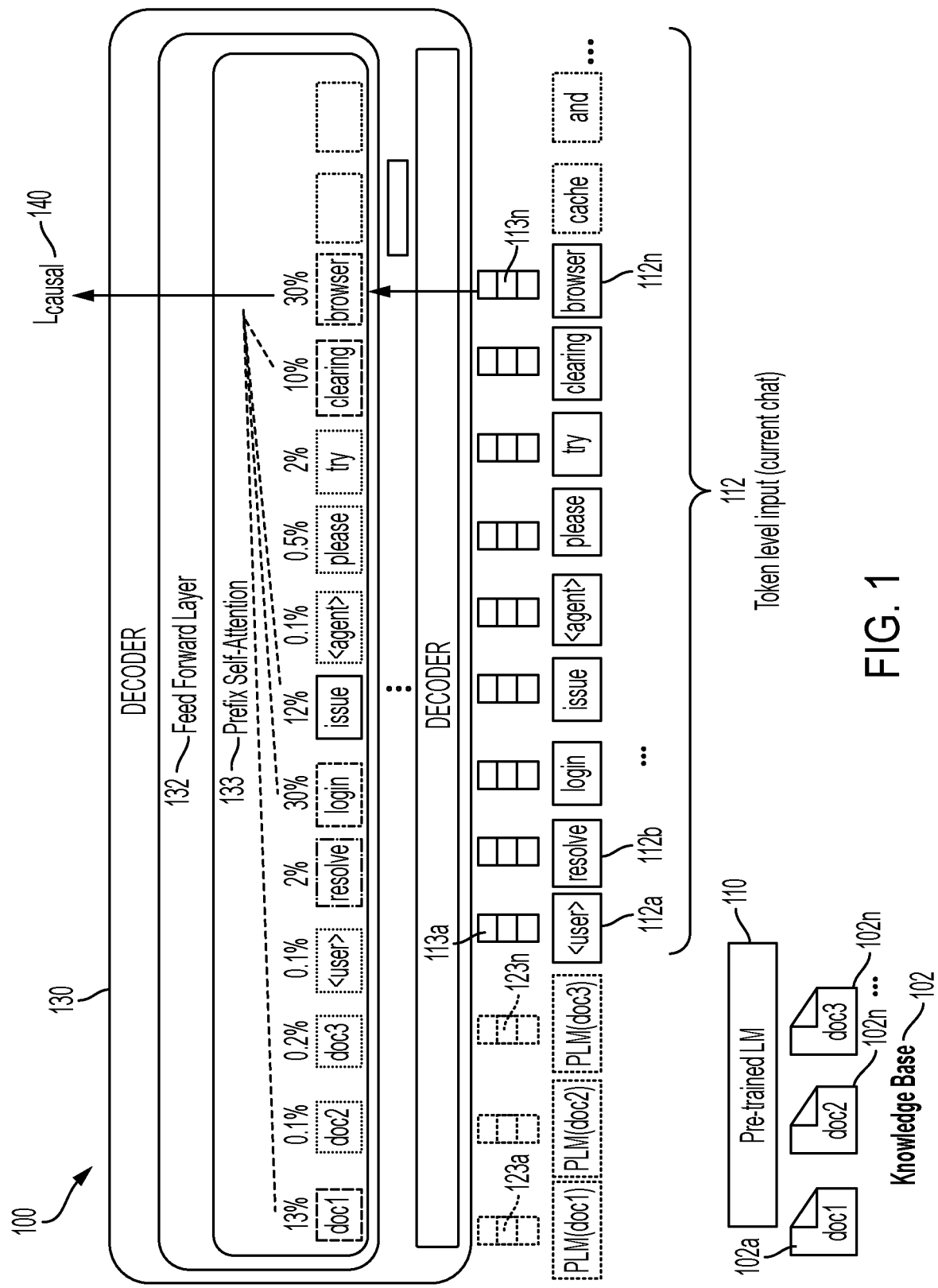
FIG. 1 is a simplified diagram illustrating a training framework of a neural network based NLP model using soft-knowledge from pre-trained LLM(s), according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Chat agents may generate responses to a user inquiry generated based on a knowledge based of knowledge documents. For example, an Information Technology (IT) support agent may receive a user inquiry on "resolve login issues." The chat agent may generate a response "please clear cache" based on a knowledge document of account issue articles, or generate a response "try other troubleshooting steps" based on a knowledge document of troubleshooting steps articles. To train the underlying neural network based NPL model of the chat agent to generate a response based on the relevant knowledge documents, however, performance of existing NLP training mechanisms is largely limited.

For example, large language models (LLMs) may be applied to in-context learning at scale significantly. Specifically, different examples of task inputs and target outputs (e.g., questions and answers, queries for documents and retrieved documents, and/or the like) are used to train LLM on the task. Such in-context learning boosts zero-shot text generation capabilities of LLMs. In particular, for task-oriented dialogue generation, a 2-step approach (relevant knowledge retrieval and grounded prompt based text generation) helps boost zero-shot performance of LLMs.

However, the amount of knowledge that can be passed into large language models (LLMs) is often limited by the maximum input sequence length (e.g., 2048 or 4096 for GPT3+ models) defined during pre-training. Additionally, the 2-step approach can cause error propagation from the knowledge retrieval step to the text generation step, e.g., when a wrong support document of "sales regulation guideline" is retrieved in response to a user utterance "resolve login issue." As the quality of the limited knowledge used is heavily dependent on the relevant knowledge retrieval step, error propagation is cause din the text generation step if misleading knowledge is used in the context.

In view of the need to train NLP models for chat agents in a computationally efficient and accurate manner, embodiments described herein provide a training framework for generative NLP models that operate on previously learnt knowledge from pretrained LLMs. Specifically, to train an NLP model to generate a response to a user utterance (e.g., "resolve login issue"), document embeddings of support IT documents encoded by a pretrained LLM are fed to an NLP decoder together with a training dialogue (e.g., a dialogue between the chat agent on how to "resolve login issue"). Document-level embeddings are concatenated with token-level embeddings (encoded from the training dialogue) for the decoder to predict a next token. The NLP decoder can thus be trained by a causal language modeling loss computed based on the predicted next token and the ground-truth token from the training dialogue. In this way, soft-knowledge from the pre-trained LLM is adopted in training the NLP decoder by using the precomputed document embeddings. As the training input is augmented with soft-knowledge from the pre-trained LLM(s), the context length or max sequence length limitations encountered by traditional NLP training framework is overcome because the training framework described herein operates on the embedding space of retrieved knowledge from pre-trained LLMs instead of the token space.

Embodiments described herein further provide a training framework for generative NLP models that improve sentence-level factuality constraints by pinpointing the right reference before generating an agent response. Specifically, current generative AI often models pose the risk of hallucination and missing explanability of their text generations. Without appropriate constraints, LLMs can generate text that is factually incorrect, which poses a risk of hallucination, a phenomenon when models unintentionally memorize specific facts instead of learning to reason and generalize based on context. Additionally, the lack of explanability can further complicate the use of LLMs in various applications where the ability to interpret and understand generated text is critical. In view of the need to improve factuality in generative NLP models, the training framework described herein, in addition to augmenting a training input of tokens with document embeddings from pre-trained LLM(s), inserts a special token at the start of each agent response in the training data. The special token indicates which reference document the subsequent agent response is based on. In this way, the NLP model is trained to predict the special token (or equivalently to predict which reference document the NLP model should bases on to generate an agent response) before generating the subsequent response. Factual explanability and correctness of the NLP model is thus improved.

Therefore, by training an NLP model to generate responses with improved accuracy and factuality, neural network technology in NLP is improved.

Overview

FIG. 1 is a simplified diagram illustrating a training framework 100 of a neural network based NLP model 130 using soft-knowledge from pre-trained LLM(s) 110, according to some embodiments. The framework 100 comprises one or more pre-trained LLM(s) 110, and the NLP model 130, which may be operatively connected to each other. Specifically, the pre-trained LLM 110 may be housed at the same server with the NLP model 130. Or alternatively, the pretrained LLM 110 may be remotely located at a different server external to the NLP model 130. The NLP model 130 may be communicatively coupled the external pre-trained LLM 110 via an application programming interface (API).

In one embodiment, to train the NLP model 130 to generate proper responses to a user utterance, token-level input (prior dialogue 112) may be used. For example, the token-level dialogue 112 may comprise a plurality of tokens 112a-n, representing a user utterance "resolve login issues," and one or more agent responses such as "please try cleaning browser cache." The token-level dialogue 112 may be encoded into token embeddings 113a-n by the encoder of the NLP model 130. In addition to token-level training inputs, document-level inputs representing the support document based on which the agent response should be generated are also used to augment the training data with soft-knowledge from pre-trained LLMs 110. For example, as a number of pre-trained and fine-tuned LLMs are made commercially available, each may have different task-specific or general capabilities/strengths. The document/sentence embeddings generated by pre-trained LLMs (e.g. sentence transformer) with GPT-3 model may be utilized in training a NLP model. The document embeddings 123a-n of the knowledge documents 102a-n from a knowledge base may be combined with token embeddings 113a-n of the token-level inputs 112a-n. It is worth noting that in FIG. 1, only one pre-trained LLM 110 is shown for illustrative purpose only. The document embeddings 123a-n may be generated by multiple pre-trained LLM(s) separately.

In one embodiment, the NLP model 130 may be trained according to causal language modeling using the augmented training input combining document embeddings 123a-n and token level inputs 113a-n. The last layer of the decoder in the NLP model 130 may be a feedforward layer 132 that performs prefix self-attention 133 on a plurality of tokens to predict a next token distribution based on an input of previous tokens and the document embeddings 123a-n. The predicted next token distribution may then be compared with the ground-truth token (e.g., "cache" in the example shown in FIG. 1) to compute a cross-entropy loss as the causal language modeling loss 140. The causal language modeling loss 140 may then be used to update the NLP model 130 via backpropagation, while the pre-trained LLM 110 remain frozen.

For example, the next token prediction may be performed progressively. Each next token prediction may be generated based on an input concatenating the document embeddings 123a-n and token embeddings of previous tokens in the token level input 112, e.g., document embeddings and the toke embeddings corresponding to tokens of "<user> resolve login issue <agent>please" may be used to predict a next token distribution for the next position that is supposedly token "try" in the token level input 112. The predicted distribution is then compared to the ground-truth token "try" to compute a cross entropy loss. Similarly, after the token at the position that is supposedly token "try" is decoded, the document embeddings and the currently decoded tokens are used to predict a next token distribution for the next position that is supposedly the token "clearing." Thus the cross entropy loss can then again be computed by comparing the next token distribution with the ground-truth token "clearing." Thus progressively causal language modeling loss may train the NLP model 130 to sequentially predict tokens that form a response to an input user utterance.

Figure 2:
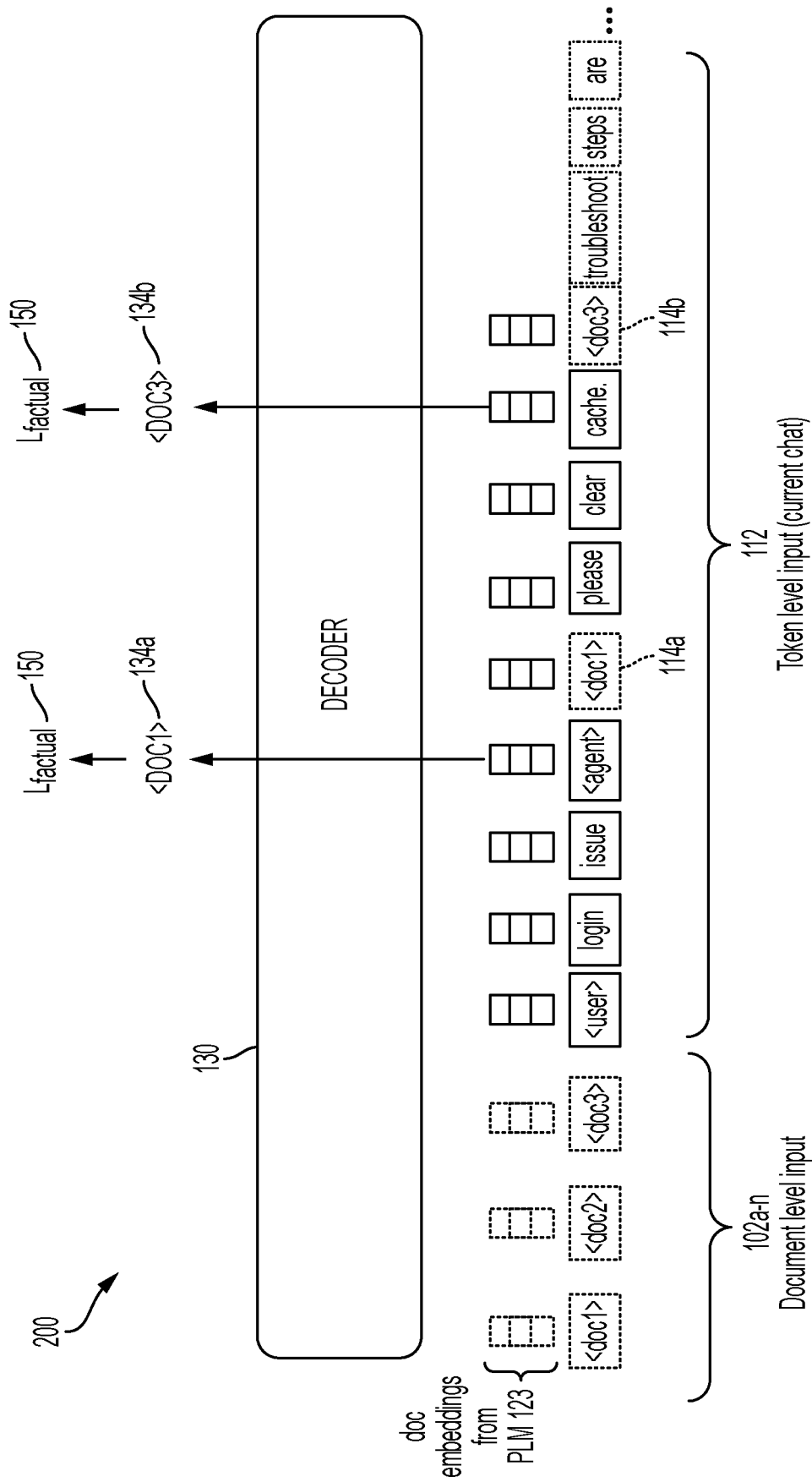
FIG. 2 is a simplified diagram illustrating a training framework of a neural network based NLP model using training data with sentence level factuality constraints, according to some embodiments.

FIG. 2 is a simplified diagram illustrating a training framework 200 of a neural network based NLP model 130 using training data with sentence level factuality constraints, according to some embodiments. The framework 200 may be built on top of the training framework 100 shown in FIG. 1, comprising one or more pre-trained LLM(s) 110, and the NLP model 130. In addition to augmenting training data with document embeddings 123 from the pre-trained LLMs, a special token may be inserted at the start of each response in the token level input 112 to indicate the knowledge document that the respective response is based on. For example, token 114a of "<doc 1>" is inserted to indicate the subsequent response "please clear cache" is generated based on <doc 1> of "account issue articles." Token 114b of "

3>" is inserted to indicate the subsequent response "troubleshooting steps" is generated based on <doc 1> of "troubleshooting articles."

In one implementation, the document identification tokens 114a-b may be annotated by a human annotator reviewing a corpus of training dialogues. For example, in case of a task-oriented dialogue, training dialogues may be processed in a way such that the response generation has 1:1 mapping between agent responses and historical chats and/or knowledge documents.

The token level input 112 augmented by the inserted document identification tokens 114a-b are then combined with document embeddings 123 from pre-trained LLM(s) to pass to the NLP model 130. The NLP model 130 may then be trained by causal language modeling losses computed based on next-token predictions token by token, in a similar manner described in relation to FIG. 1.

Specifically, when the next-prediction token comes to predict a next token that is supposedly at the start of an agent response, such as tokens 114a-b, the decoder of the NLP model 130 may predict a next token distribution 134a or 134b, which are compared with the ground-truth tokens 114a-b to compute a cross entropy loss as the factual alignment loss 150. As the factual alignment loss 150 contributes to the causal language modeling loss used to update the NLP model 130 via backpropagation, the NLP model 130 is thus trained to predict the document identification token 114a or 114b at the start of an agent response, indicating which knowledge document the subsequent agent response is based on.

Figure 3A:
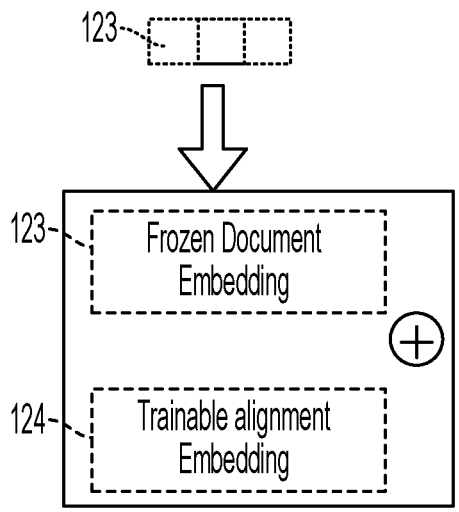
FIGS. 3A-3C are simplified diagrams illustrating example augmented embeddings using the training frameworks shown in FIGS. 1-2, according to embodiments described herein.
Figure 3B:
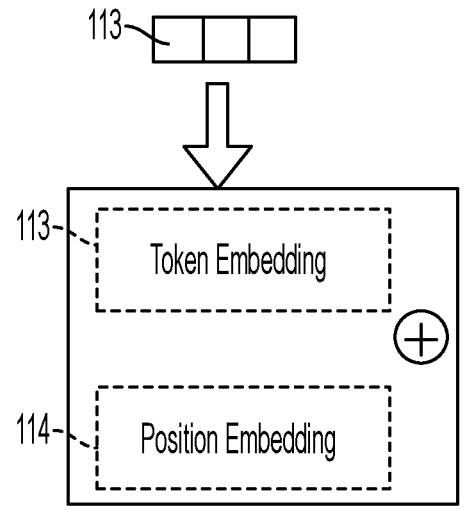
Figure 3C:
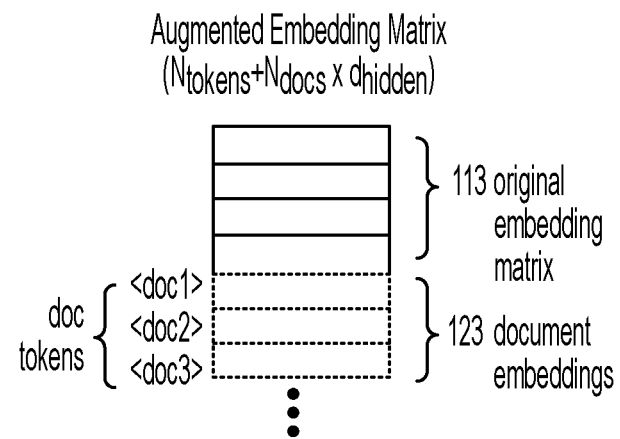

FIGS. 3A-3C are simplified diagrams illustrating example augmented embeddings using the training frameworks 100 or 200 shown in FIGS. 1-2, according to embodiments described herein. As shown in FIG. 1, without modifying the masked self-attention 133 at the feedforward layer 132 in the decoder of the NLP model 130, a new set of document tokens are introduced into existing decoder vocabulary. Unlike the typical transformer models for tokens sequence, document embeddings 123a-n may or may not need positional information. Therefore, the document embeddings 123a-n may be ordered based on their significance (e.g., similarity score between a knowledge document and the user utterance based on a retrieval model). In another implementation, the document embeddings 123a-n may be randomly order. In either case, an additional set of embeddings may be adopted to incorporate positional information or align document embeddings with the token embeddings, e.g., to align the document embedding with the start token of an agent response which is based on the corresponding knowledge document.

As shown in FIG. 3A, each document embedding 123 in FIGS. 1-2 may be replace by a combination of the frozen document embedding 123 and trainable alignment embedding 124. For example, the trainable alignment embedding 124 may contain alignment information that aligns an agent response that is based on the corresponding knowledge document, e.g., alignment embedding 124 may be added to document embedding 123a for <doc 1> to align with the token 114a. Such alignment embedding 124 may be updated during training, e.g., based on the factual alignment loss 150 discussed in relation to FIG. 2.

As shown in FIG. 3B, each token embedding 113 (including any of 113a-n shown in FIGS. 1-2) may be replaced by a combination of the token embedding 113 and a position embedding 114, indicating the position of the respective token in the training input.

In some embodiments, a combination of position and alignment embeddings, may be combined with the document embedding 123 or token embedding 113. Or the document embeddings 123 can also be interleaved with the token embeddings 113.

As shown in FIG. 3C, the embedding matrix is augmented by combining the original embedding matrix containing rows of token embeddings 113 and document embeddings 123.

Figure 4:
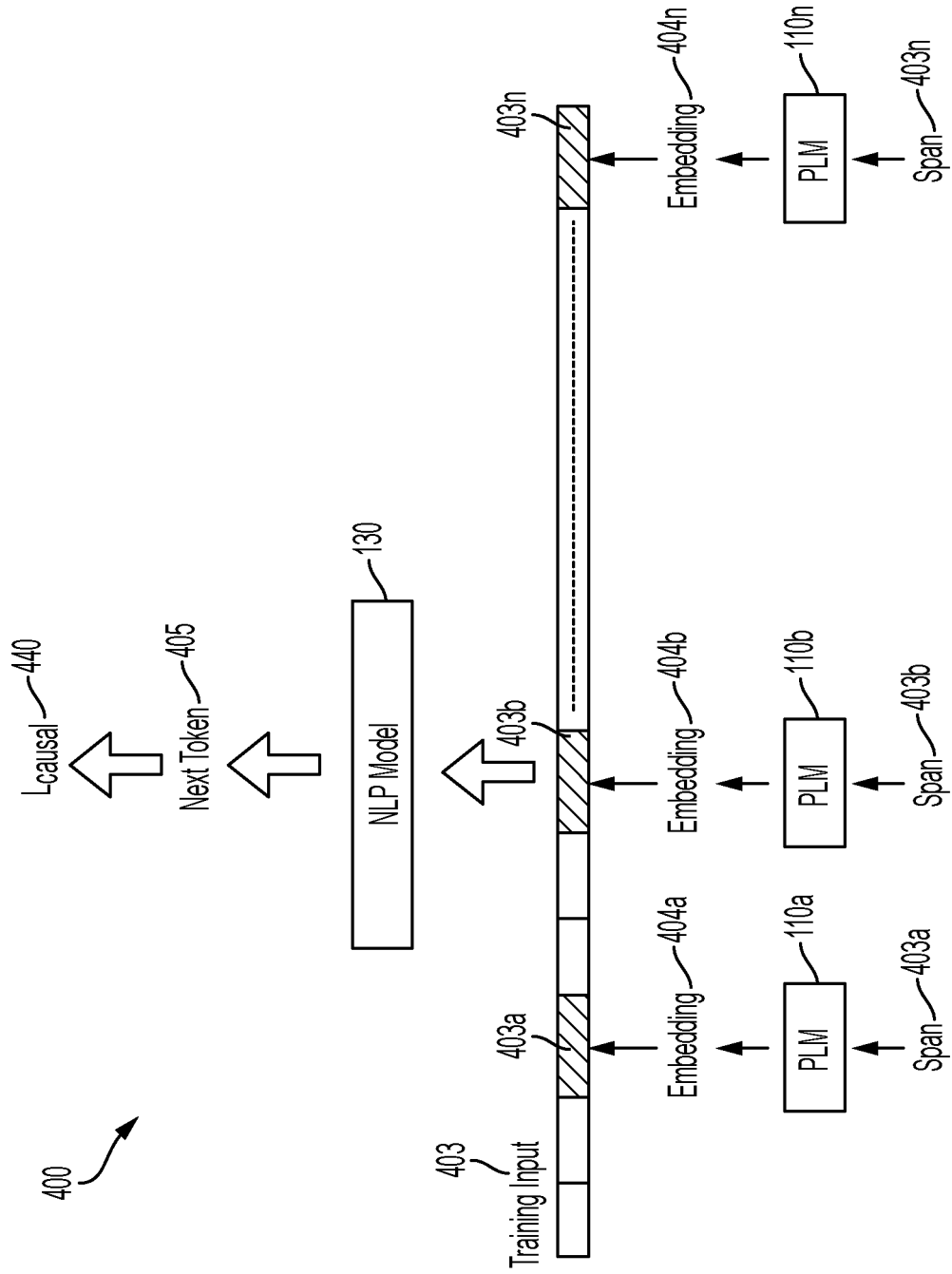
FIG. 4 is a simplified diagram illustrating a training framework that distills knowledge from pre-trained LLM(s), according to embodiments described herein.

FIG. 4 is a simplified diagram illustrating a training framework 400 that distills knowledge from pre-trained LLM(s), according to embodiments described herein. During pre-training or training of the NLP model 130, the training input 403, e.g., in the form of a sequence of tokens representing a user-agent dialogue, may be randomly masked for a few spans 403a-n, which can be one or more tokens, one or more words, one or more sentences, or one or more paragraphs. These masked spans are replaced with their embeddings 404a-n generated from pre-trained LLM(s) 110a-n.

As shown in FIG. 4, the embeddings 404a-n may be retrieved from the same, or different pre-trained LLMs 110a-n. Some of the span embeddings (e.g., frequently selected spans) may be precompute and stored prior to the training to improve computational efficiency at training time.

For example, for input tokens: $t_1, t_2, \ldots, t_n$ in the training input 403, $|S|$ spans (e.g., 2 spans $t_{1:k}$ and $t_{k+1:k+m}$) of tokens are replaced with their embeddings. The training input then becomes $f(t_{1:k}), f(t_{k+1:k+m}), t_{k+m+1}, t_{k+m+2}, \ldots, t_n$. Here 'f', is document embedding, retrieved based on an existing LLM, mapped to the dimension of the NLP model 130 using a feed-forward neural network layer 132.

Therefore, the NLP model 130 may then be trained using the new pre-processed training input using causal language modeling loss 140 as described in relation to FIG. 1. Specifically, during training, the generation of masked span-embedding 403a-n may be skilled.

In another embodiment, training framework 400 may be applied to an adaptation during instruction tuning. For example, for a given supervised dataset, a number of samples may be randomly selected and transformed to their embeddings using one or more randomly chosen pre-trained LLMs. These embeddings may be used to train the NLP model 130 as in-context examples.

In another implementation, tunable soft prompts may be further appended to the training input 403, or a feed forward layer may be added between the training input 403 and the NLP model 130. The soft prompts and/or the feed forward layer may be updated together with the NLP model 130 via backpropagation.

Computer and Network Environment

Figure 5A:
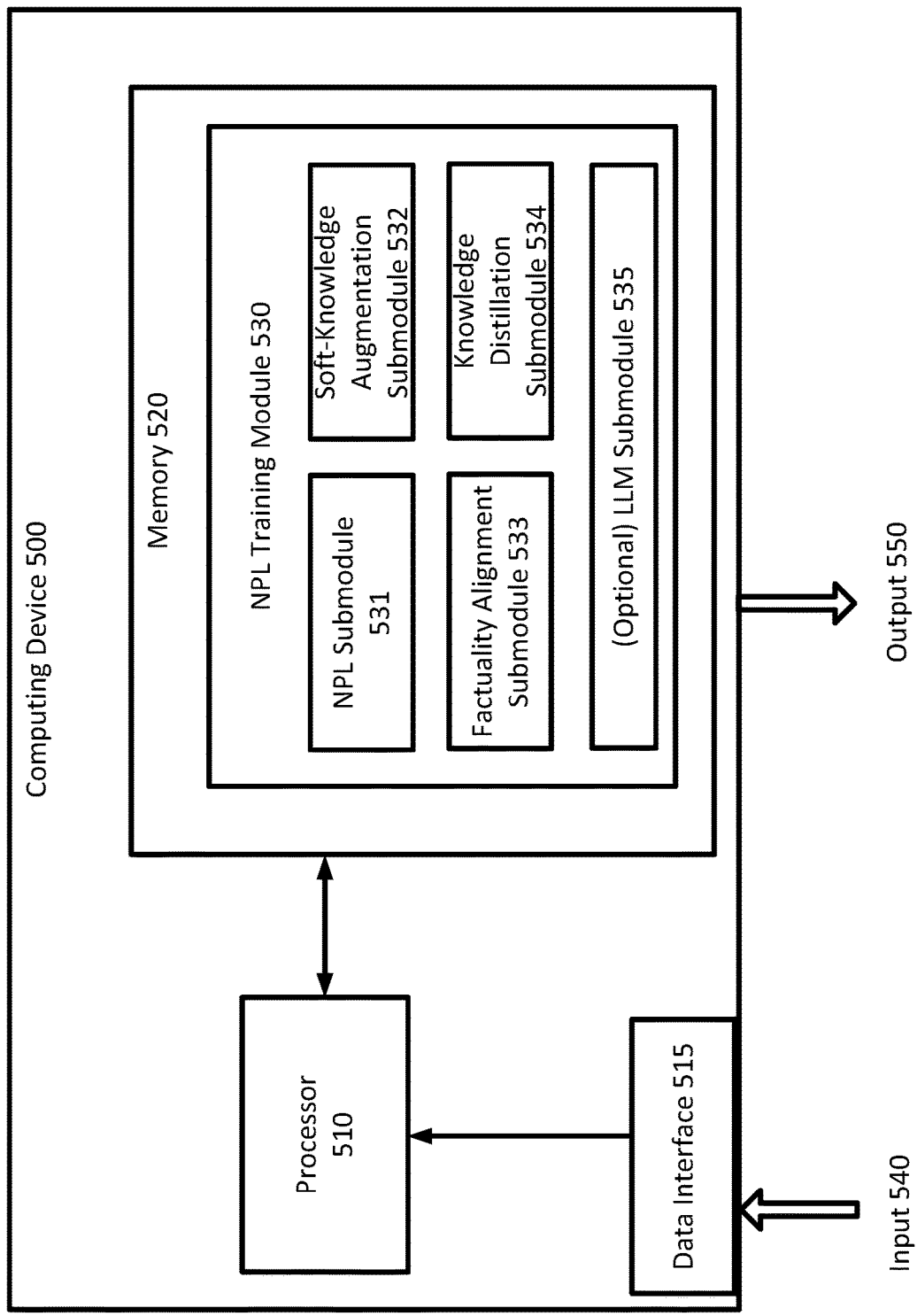
FIG. 5A is a simplified diagram illustrating a computing device implementing the training framework(s) described in FIGS. 1-4, according to one embodiment described herein.

FIG. 5A is a simplified diagram illustrating a computing device implementing the training framework(s) described in FIGS. 1-4, according to one embodiment described herein. As shown in FIG. 5A, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for NPL training module 530 that may be used to implement and/or emulate the systems and models, and/or to implement any of the methods described further herein. NPL training module 530 may receive input 540 such as input (e.g., a user utterance) via the data interface 515 and generate an output 550 which may be an agent response. Examples of the input data may include training inputs such as a prior user-agent dialogue (e.g., 112 in FIG. 1), document embeddings (e.g., 123*a-n* in FIG. 1) from external LLMs, and/or the like. Examples of the output data may include a next token prediction during training.

The data interface 515 may comprise a communication interface, a user interface (such as a voice input interface, a graphical user interface, and/or the like). For example, the computing device 500 may receive the input 540 (such as a training dataset) from a networked database via a communication interface. Or the computing device 500 may receive the input 540, such as a user utterance, from a user via the user interface.

In some embodiments, the NPL training module 530 is configured to perform training of the NLP submodule 531 (e.g., similar to 130 in FIG. 1). The NPL training module 530 may further include a soft-knowledge augmentation submodule 532, a factuality alignment submodule 533, a knowledge distillation submodule 534, and optionally a pretrained LLM 535. The soft-knowledge augmentation submodule 532 may train the NPL submodule 531 by transforming a training input such as token-level input 112 in FIG. 1 into an augmented training input that combines document embeddings 123*a-n* with the token-level input 112, as described in FIG. 1. The factuality alignment submodule 533 may train the NPL submodule 531 by inserting a document identification token at the start of each agent response in the training input 112, as described in FIG. 2. The knowledge distillation submodule 534 may train the NPL submodule 531 by utilizing span embeddings generated by LLM submodules 535 to randomly mask spans in a training input, as described in FIG. 4. The LLM submodule 535 may be optionally housed at the same device/server with the other submodules 531-534, or may be housed external to the computing device 500.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 5B:
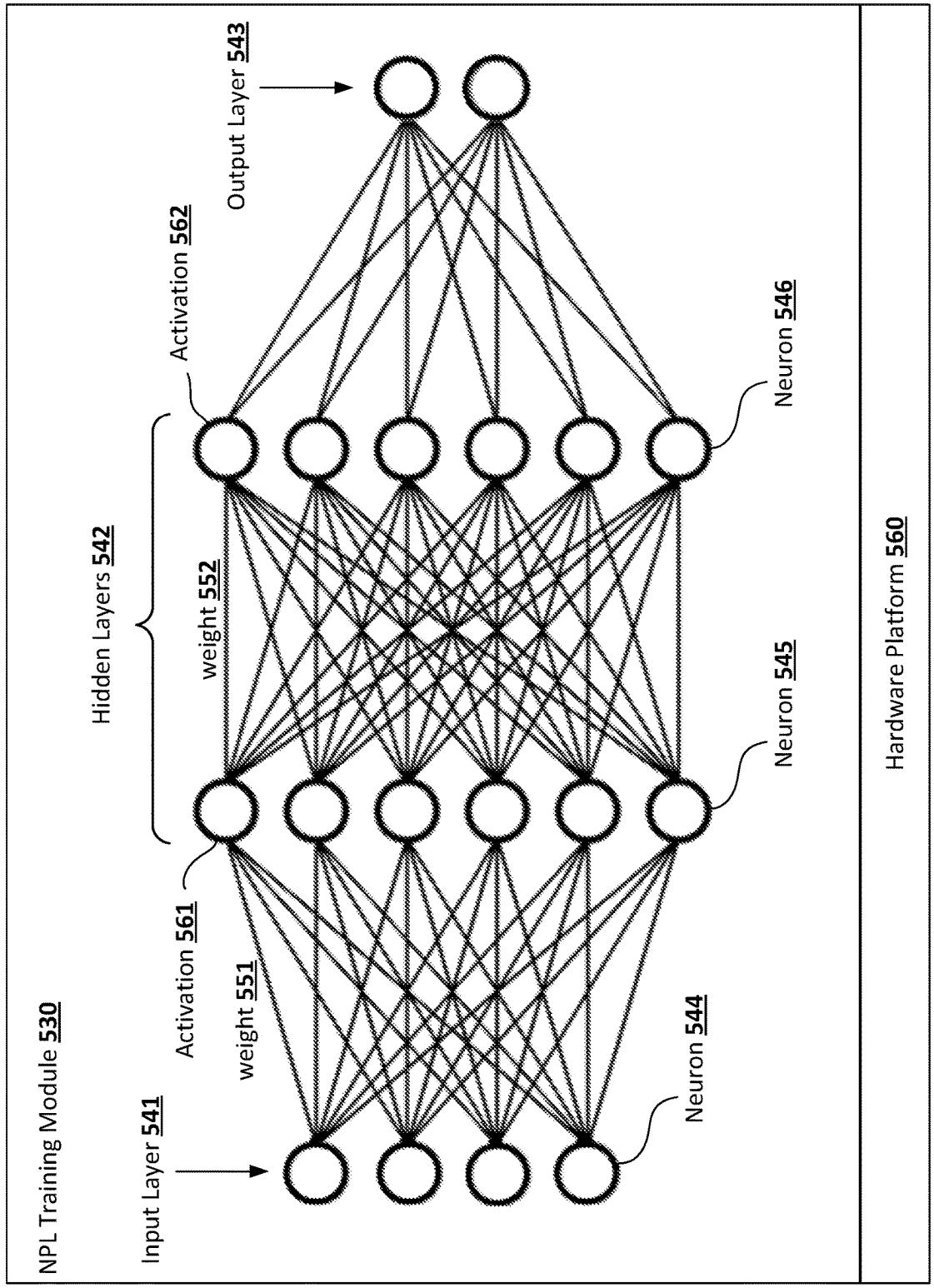
FIG. 5B is a simplified diagram illustrating the neural network structure implementing the NPL training module described in FIG. 5A, according to some embodiments.

FIG. 5B is a simplified diagram illustrating the neural network structure implementing the NPL training module 530 described in FIG. 5A, according to some embodiments. In some embodiments, the NPL training module 530 and/or one or more of its submodules 531-535 may be implemented at least partially via an artificial neural network structure shown in FIG. 5B. The neural network comprises a computing system that is built on a collection of connected units or nodes, referred to as neurons (e.g., 544, 545, 546). Neurons are often connected by edges, and an adjustable weight (e.g., 551, 552) is often associated with the edge. The neurons are often aggregated into layers such that different layers may perform different transformations on the respective input and output transformed input data onto the next layer.

For example, the neural network architecture may comprise an input layer 541, one or more hidden layers 542 and an output layer 543. Each layer may comprise a plurality of neurons, and neurons between layers are interconnected according to a specific topology of the neural network topology. The input layer 541 receives the input data (e.g., 540 in FIG. 5A), such as a user utterance. The number of nodes (neurons) in the input layer 541 may be determined by the dimensionality of the input data (e.g., the length of a vector of an augmented training input combining token level input 112 and document embeddings 123*a-n* in FIG. 1). Each node in the input layer represents a feature or attribute of the input.

The hidden layers 542 are intermediate layers between the input and output layers of a neural network. It is noted that two hidden layers 542 are shown in FIG. 5B for illustrative purpose only, and any number of hidden layers may be utilized in a neural network structure. Hidden layers 542 may extract and transform the input data through a series of weighted computations and activation functions.

For example, as discussed in FIG. 5A, the NPL training module 530 receives an input 540 of a user utterance and transforms the input into an output 550 of a predicted agent response. To perform the transformation, each neuron receives input signals, performs a weighted sum of the inputs according to weights assigned to each connection (e.g., 551, 552), and then applies an activation function (e.g., 561, 562, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 541 is transformed into rather different values indicative data characteristics corresponding to a task that the neural network structure has been designed to perform.

The output layer 543 is the final layer of the neural network structure. It produces the network's output or prediction based on the computations performed in the preceding layers (e.g., 541, 542). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the NPL training module 530 and/or one or more of its submodules 531-535 may comprise the transformative neural network structure of layers of neurons, and weights and activation functions describing the non-linear transformation at each neuron. Such a neural network structure is often implemented on one or more hardware processors 510, such as a graphics processing unit (GPU). An example neural network may be a Transformer model, and/or the like.

In one embodiment, the NPL training module 530 and its submodules 531-535 may be implemented by hardware, software and/or a combination thereof. For example, the NPL training module 530 and its submodules 531-535 may comprise a specific neural network structure implemented and run on various hardware platforms 560, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 560 used to implement the neural network structure is specifically configured based on factors such as the complexity of the neural network, the scale of the tasks (e.g., training time, input data scale, size of training dataset, etc.), and the desired performance.

In one embodiment, the neural network based NPL training module 530 and one or more of its submodules 531-535 may be trained by iteratively updating the underlying parameters (e.g., weights 551, 552, etc., bias parameters and/or coefficients in the activation functions 561, 562 associated with neurons) of the neural network based on a loss such as a causal language modeling loss 140 in FIG. 1 or factual alignment loss 150 in FIG. 2. For example, during forward propagation, the training data such as token-level prior user-agent dialogue 112 are fed into the neural network. The data flows through the network's layers 541, 542, with each layer performing computations based on its weights, biases, and activation functions until the output layer 543 produces the network's output 550. In some embodiments, output layer 543 produces an intermediate output on which the network's output 550 is based.

The output generated by the output layer 543 such as a next token is compared to the expected output (e.g., a "ground-truth" such as the corresponding token in the prior dialogue) from the training data, to compute a loss function that measures the discrepancy between the predicted output and the expected output. For example, the loss function may be a cross-entropy loss. Given the loss, the negative gradient of the loss function is computed with respect to each weight of each layer individually. Such negative gradient is computed one layer at a time, iteratively backward from the last layer 543 to the input layer 541 of the neural network. These gradients quantify the sensitivity of the network's output to changes in the parameters. The chain rule of calculus is applied to efficiently calculate these gradients by propagating the gradients backward from the output layer 543 to the input layer 541.

Parameters of the neural network are updated backwardly from the last layer to the input layer (backpropagating) based on the computed negative gradient using an optimization algorithm to minimize the loss. The backpropagation from the last layer 543 to the input layer 541 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generate a response in response to a user utterance and providing an explanation of the response (e.g., by referencing a knowledge document).

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

Therefore, the training process transforms the neural network into an "updated" trained neural network with updated parameters such as weights, activation functions, and biases. The trained neural network thus improves neural network technology in automatic intelligent user-interaction system such as chat bots.

Figure 6:
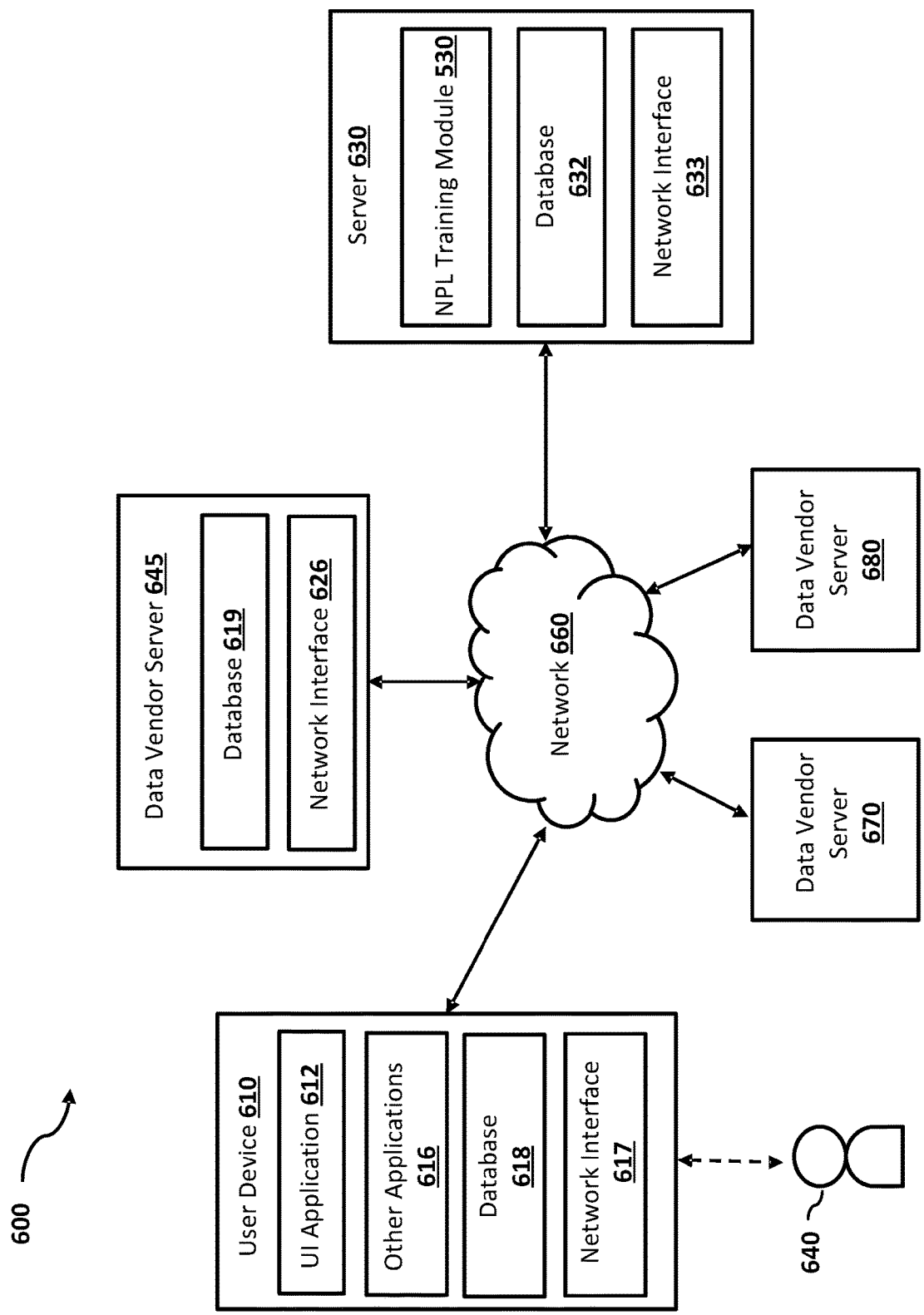
FIG. 6 is a simplified block diagram of a networked system suitable for implementing the training frameworks described in FIGS. 1-4 and other embodiments described herein.

FIG. 6 is a simplified block diagram of a networked system 600 suitable for implementing the training frameworks described in FIGS. 1-4 and other embodiments described herein. In one embodiment, system 600 includes the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5A, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLER. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating an agent response from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view a user-agent dialogue.

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 617 adapted to communicate with data vendor server 645 and/or the server 630. In various embodiments, network interface component 617 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts database 619 to provide training datasets including prior user-agent dialogues to the server 630. The database 619 may be implemented by one or more relational database, distributed databases, cloud databases, and/or the like.

In some embodiments, the data vendor server 645 may host a commercially available LLM such that the data vendor server 645 may provide precomputed document embeddings (e.g., 123a-n in FIG. 1) to the server 630.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 619, via the network interface 626, to the server 630.

The server 630 may be housed with the NPL training module 530 and its submodules described in FIG. 5A. In some implementations, NPL training module 530 may receive data from database 619 at the data vendor server 645 via the network 660 to generate an agent response. The generated agent response may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the NPL training module 530. In one implementation, the database 632 may store previously generated dialogues, document embeddings and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In some embodiments, network interface component 633 may comprise a DSL (e.g., Digital Subscriber Line)

modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Work Flows

Figure 7:
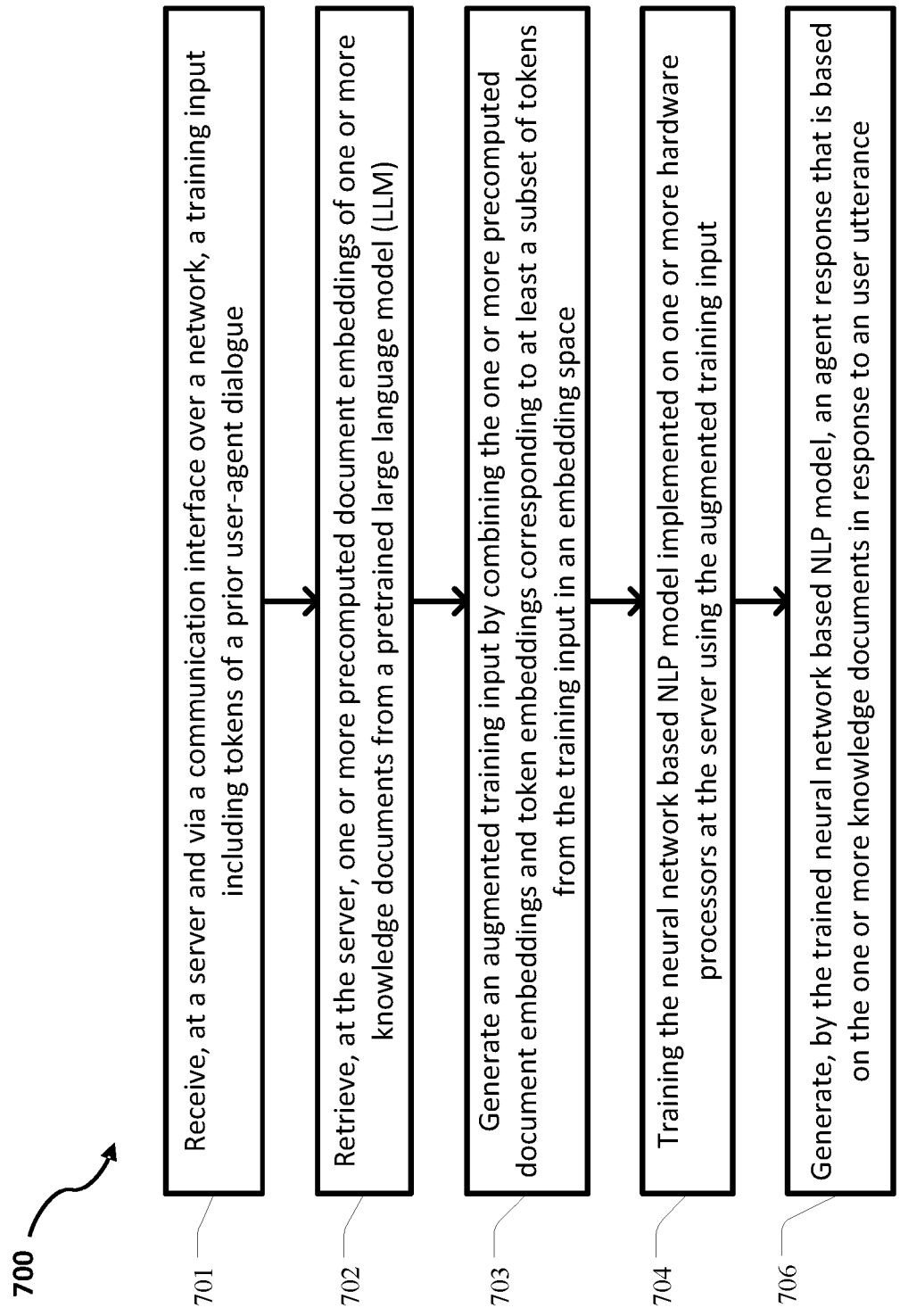
FIG. 7 is an example logic flow diagram illustrating a method of training a neural network based natural language processing (NLP) model based on the framework shown in FIGS. 1-3, according to some embodiments described herein.

FIG. 7 is an example logic flow diagram illustrating a method of training a neural network based natural language processing (NLP) model based on the framework shown in FIGS. 1-3, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the NPL training module 530 (e.g., FIGS. 5-6) that performs NPL model training.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a training input including tokens of a prior user-agent dialogue (e.g., 112 in FIG. 1) may be received at a server (e.g., 630 in FIG. 6) and via a communication interface (e.g., 515 in FIG. 5A, 633 in FIG. 6) over a network (e.g., 660 in FIG. 6). For example, the prior user-agent dialogue comprises a prior user utterance and at least one prior system response generated in response to the prior user utterance based on at least one of the one or more knowledge documents.

At step 702, one or more precomputed document embeddings (e.g., 123*a-n* in FIG. 1) of one or more knowledge documents (e.g., 102*a-n* in FIG. 1) from a pretrained large language model (LLM) (e.g., 110 in FIG. 1) may be retrieved. For example, the one or more precomputed document embeddings are retrieved via an application programming interface (API) at the server, which connects the server (e.g., 630 in FIG. 6) to an external server that hosts the pretrained LLM. The one or more precomputed document embeddings are generated by the pretrained LLM and stored at the external server prior to training the neural network based natural language processing (NLP) model to save runtime efficiency.

At step 703, an augmented training input may be generated by combining the one or more precomputed document embeddings and token embeddings corresponding to at least a subset of tokens from the training input in an embedding space. In some implementations, a document identification token indicating a first knowledge document from the one or more knowledge documents may be inserted at a start of a first prior system response in the prior user-agent dialogue.

At step 704, the neural network based NLP model (e.g., 130 in FIG. 1, 531 in FIG. 5A) implemented on one or more hardware processors (e.g., 560 in FIG. 5B) at the server may be trained using the augmented training input. For example, the neural network based NLP model may predict a next token subsequent to the subset of tokens in response to the augmented training input. A causal language modeling loss (e.g., 140 in FIG. 1) may be computed based on the predicted next token and a ground-truth token from the tokens of a prior user-agent dialogue. Parameters of the neural network based NLP model based on the causal language modeling loss, via backpropagation as described in relation to FIG. 5B.

When a document identification token is inserted into the augmented training input, the neural network based NLP model may predict a document identification in response to the augmented training input. A factual alignment loss (e.g., 150 in FIG. 2) may be computed by comparing the predicted document identification and the ground-truth token. Parameters of the neural network based NLP model based on the factual alignment loss, via backpropagation as described in relation to FIG. 5B.

At step 706, the trained neural network based NLP model may generate an agent response that is based on the one or more knowledge documents in response to an user utterance. For example, the trained neural network based NLP model may generate a document identification token at a start of the agent response in response to an user utterance, indicating which knowledge document the agent response is based on.

Figure 8:
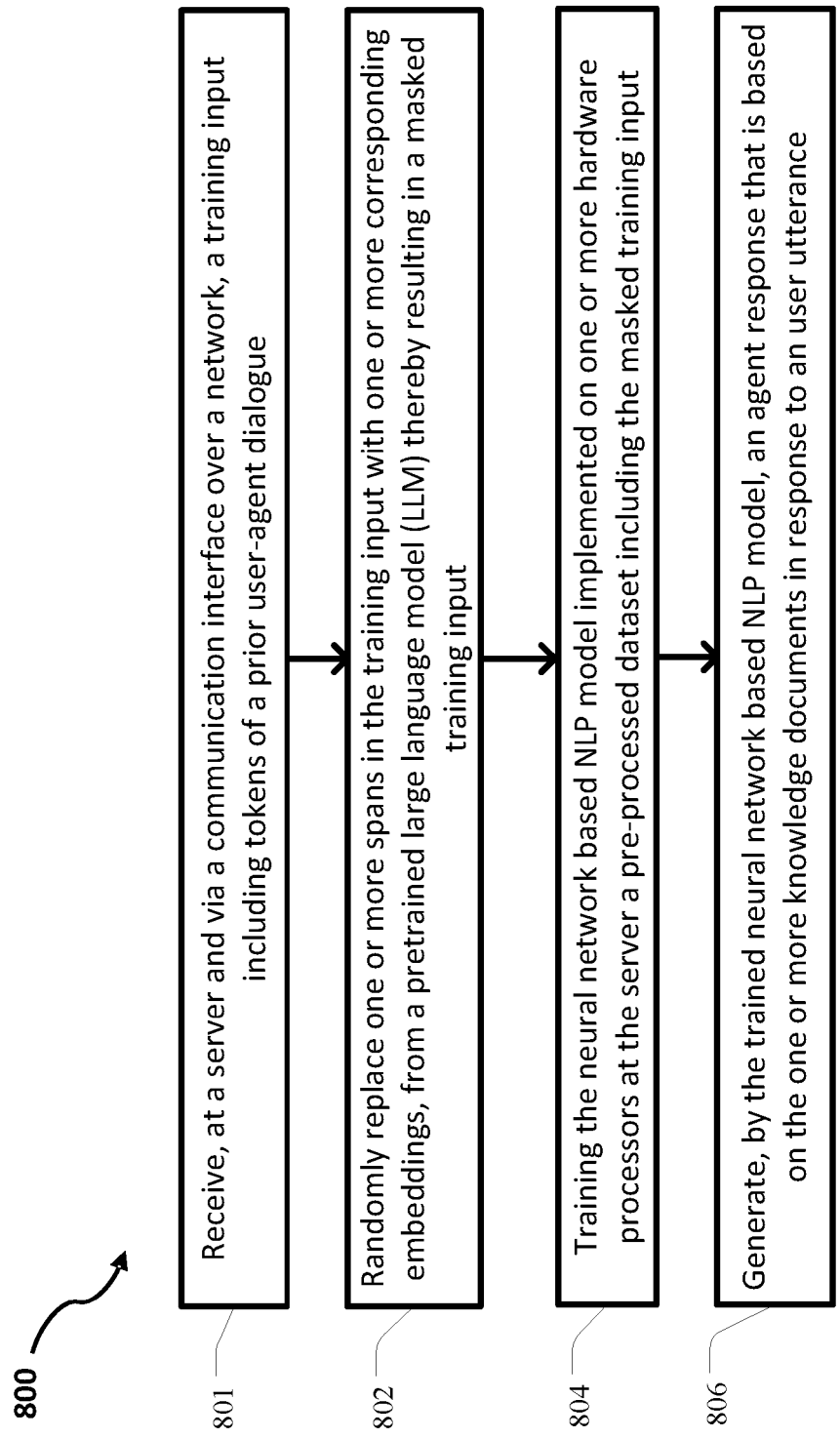
FIG. 8 is an example logic flow diagram illustrating a method of training a neural network based natural language processing (NLP) model based on the framework shown in FIG. 4, according to some embodiments described herein.

FIG. 8 is an example logic flow diagram illustrating a method of training a neural network based natural language processing (NLP) model based on the framework shown in FIG. 4, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the NPL training module 530 (e.g., FIGS. 5-6) that performs NPL model training.

As illustrated, the method 800 includes a number of enumerated steps, but aspects of the method 800 may include additional steps before, after, and in between the enumerated steps. In some aspects, one or more of the enumerated steps may be omitted or performed in a different order.

At step 801, a training input including tokens of a prior user-agent dialogue (e.g., 112 in FIG. 1) may be received at a server (e.g., 630 in FIG. 6) and via a communication interface (e.g., 515 in FIG. 5A, 633 in FIG. 6) over a network (e.g., 660 in FIG. 6). For example, the prior user-agent dialogue comprises a prior user utterance and at least one prior system response generated in response to the prior user utterance based on at least one of the one or more knowledge documents.

At step 802, one or more spans (e.g., 403*a-n* in FIG. 4) in the training input are randomly replaced with one or more corresponding embeddings (e.g., 404*a-n* in FIG. 4), thereby resulting in a masked training input. The one or more corresponding embeddings have a same dimension of the neural network based NLP model. At least one span includes a sentence or a paragraph, and the one or more corresponding embeddings are generated by the pretrained LLM (e.g., 110*a-n* in FIG. 4).

At step 804, the neural network NLP model is trained using a pre-processed dataset including the masked training input.

At step 806, At step 706, the trained neural network based NLP model may generate an agent response that is based on the one or more knowledge documents in response to an user utterance.

In some embodiments, methods 700 and 800 may be combined. For example, the augmented training input from step 703 may be masked in the way described at step 802. The resulting masked augmented training input may be used to train the neural network based NLP model.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for training a neural network based natural language processing (NLP) model, comprising:
   receiving, at a server and via a communication interface over a network, a training input including tokens of a prior user-agent dialogue;
   retrieving, at the server, one or more precomputed document embeddings of one or more knowledge documents from a pretrained large language model (LLM);
   generating an augmented training input by combining the one or more precomputed document embeddings and token embeddings corresponding to at least a subset of tokens from the training input in an embedding space, wherein the generating comprises inserting a first token indicating a first knowledge document from the one or more knowledge documents at a start of a first prior system response in the prior user-agent dialogue;
   training the neural network based NLP model implemented on one or more hardware processors at the server using the augmented training input, wherein the training comprises:
   predicting, by the neural network based NLP model, a document identification in response to the augmented training input,
   computing a factual alignment loss by comparing the predicted document identification and the first token, and
   updating parameters of the neural network based NLP model based on the factual alignment loss; and
   generating, by the trained neural network based NLP model, an agent response that is based on the one or more knowledge documents in response to a user utterance.

2. The method of claim 1, wherein the prior user-agent dialogue comprises a prior user utterance and at least one prior system response generated in response to the prior user utterance based on at least one of the one or more knowledge documents.

3. The method of claim 1, wherein the one or more precomputed document embeddings are retrieved via an application programming interface (API) at the server, which connects the server to an external server that hosts the pretrained LLM, and
   wherein the one or more precomputed document embeddings are generated by the pretrained LLM and stored at the external server prior to training the neural network based natural language processing (NLP) model.

4. The method of claim 1, wherein the training the neural network based NLP model using the augmented training input further comprises:
   predicting, by the neural network based NLP model, a next token subsequent to the subset of tokens in response to the augmented training input;
   computing a causal language modeling loss based on the predicted next token and a ground-truth token from the tokens of a prior user-agent dialogue; and
   updating parameters of the neural network based NLP model based on the causal language modeling loss.

5. The method of claim 1, further comprising:
   generating, by the trained neural network based NLP model, a document identification token at a start of the agent response in response to an user utterance, wherein the document identification token indicates which knowledge document the agent response is based on.

6. The method of claim 1, further comprising:
   pretraining the neural network based NLP model by:
   randomly replacing one or more spans in the training input with one or more corresponding embeddings, thereby resulting in a masked training input,
   wherein the one or more corresponding embeddings have a same dimension of the neural network based NLP model; and
   training the neural network NLP model using a pre-processed dataset including the masked training input.

7. The method of claim 6, wherein at least one span includes a sentence or a paragraph, and wherein the one or more corresponding embeddings are generated by the pretrained LLM.

8. The method of claim 1, further comprising:
   transforming multiple randomly selected training samples into corresponding embeddings generated by the pretrained LLM; and training the neural network based NLP model using the corresponding embeddings as in-context examples.

9. A system for training a neural network based natural language processing (NLP) model, comprising:
- a memory that stores the neural network based NLP model and a plurality of processor executable instructions;
- a communication interface that receives a training input including tokens of a prior user-agent dialogue; and
- one or more hardware processors that read and execute the plurality of processor-executable instructions from the memory to perform operations comprising:
    - retrieving, at the server, one or more precomputed document embeddings of one or more knowledge documents from a pretrained large language model (LLM);
    - generating an augmented training input by combining the one or more precomputed document embeddings and token embeddings corresponding to at least a subset of tokens from the training input in an embedding space, wherein the generating comprises inserting a first token indicating a first knowledge document from the one or more knowledge documents at a start of a first prior system response in the prior user-agent dialogue;
    - training the neural network based NLP model implemented on one or more hardware processors at the server using the augmented training input, wherein the training comprises:
        - predicting, by the neural network based NLP model, a document identification in response to the augmented training input,
        - computing a factual alignment loss by comparing the predicted document identification and the first token, and
        - updating parameters of the neural network based NLP model based on the factual alignment loss; and
    - generating, by the trained neural network based NLP model, an agent response that is based on the one or more knowledge documents in response to a user utterance.

10. The system of claim 9, wherein the prior user-agent dialogue comprises a prior user utterance and at least one prior system response generated in response to the prior user utterance based on at least one of the one or more knowledge documents.

11. The system of claim 9, wherein the one or more precomputed document embeddings are retrieved via an application programming interface (API) at the server, which connects the server to an external server that hosts the pretrained LLM, and
    wherein the one or more precomputed document embeddings are generated by the pretrained LLM and stored at the external server prior to training the neural network based natural language processing (NLP) model.

12. The system of claim 9, wherein the operation of training the neural network based NLP model using the augmented training input further comprises:
    - predicting, by the neural network based NLP model, a next token subsequent to the subset of tokens in response to the augmented training input;
    - computing a causal language modeling loss based on the predicted next token and a ground-truth token from the tokens of a prior user-agent dialogue; and
    - updating parameters of the neural network based NLP model based on the causal language modeling loss.

13. The system of claim 9, wherein the operations further comprise:
    generating, by the trained neural network based NLP model, a document identification token at a start of the agent response in response to an user utterance, wherein the document identification token indicates which knowledge document the agent response is based on.

14. The system of claim 9, wherein the operations further comprise:
    pretraining the neural network based NLP model by:
        - randomly replacing one or more spans in the training input with one or more corresponding embeddings, thereby resulting in a masked training input,
        - wherein the one or more corresponding embeddings have a same dimension of the neural network based NLP model; and
        - training the neural network NLP model using a preprocessed dataset including the masked training input.

15. The system of claim 14, wherein at least one span includes a sentence or a paragraph, and wherein the one or more corresponding embeddings are generated by the pretrained LLM.

16. A non-transitory machine-readable medium comprising a plurality of machine-executable instructions which, when executed by one or more processors, are adapted to cause the one or more processors to perform operations comprising:
    - receiving, at a server and via a communication interface over a network, a training input including tokens of a prior user-agent dialogue;
    - retrieving, at the server, one or more precomputed document embeddings of one or more knowledge documents from a pretrained large language model (LLM);
    - generating an augmented training input by combining the one or more precomputed document embeddings and token embeddings corresponding to at least a subset of tokens from the training input in an embedding space, wherein the generating comprises inserting a first token indicating a first knowledge document from the one or more knowledge documents at a start of a first prior system response in the prior user-agent dialogue;
    - training the neural network based NLP model implemented on one or more hardware processors at the server using the augmented training input, wherein the training comprises:
        - predicting, by the neural network based NLP model, a document identification in response to the augmented training input,
        - computing a factual alignment loss by comparing the predicted document identification and the first token, and
        - updating parameters of the neural network based NLP model based on the factual alignment loss; and
    - generating, by the trained neural network based NLP model, an agent response that is based on the one or more knowledge documents in response to a user utterance.

* * * * *